(12) United States Patent
Stevens et al.

(10) Patent No.: US 10,827,884 B2
(45) Date of Patent: Nov. 10, 2020

(54) BAKEWARE AND COOKWARE ORGANIZER

(71) Applicant: DV International Inc., St. Paul, MN (US)

(72) Inventors: Hallie L. Stevens, St. Paul, MN (US); Devee McNally, St. Paul, MN (US)

(73) Assignee: DV International Inc., St. Paul, MN (US)

( * ) Notice: Subject to any disclaimer, the term of this patent is extended or adjusted under 35 U.S.C. 154(b) by 0 days.

(21) Appl. No.: 16/195,511

(22) Filed: Nov. 19, 2018

(65) Prior Publication Data

US 2019/0159632 A1    May 30, 2019

Related U.S. Application Data

(60) Provisional application No. 62/588,307, filed on Nov. 17, 2017.

(51) Int. Cl.
| | |
|---|---|
| *A47J 47/16* | (2006.01) |
| *A47B 81/00* | (2006.01) |
| *A47F 7/00* | (2006.01) |
| *A47B 77/14* | (2006.01) |
| *A47B 77/18* | (2006.01) |
| *A47B 81/04* | (2006.01) |

(52) U.S. Cl.
CPC .............. *A47J 47/16* (2013.01); *A47B 77/14* (2013.01); *A47B 77/18* (2013.01); *A47B 81/00* (2013.01); *A47B 81/04* (2013.01); *A47F 7/0035* (2013.01); *A47F 7/0064* (2013.01)

(58) Field of Classification Search
CPC . A47J 47/16; A47J 47/20; A47J 47/00; A47B 81/00; A47B 45/00; A47B 63/00; A47B 65/00; A47B 65/10; A47B 65/15; A47B 46/00; A47B 77/14; A47B 77/16; A47B 77/18; A47B 77/06; A47B 81/04; A47F 5/10; A47F 7/0028; A47F 7/0007; A47F 7/0064; A47F 7/0035; A47F 7/0042; A47F 7/0057
USPC ......... 211/85.13, 126.13, 126.7, 85.4, 41.11, 211/41.1–41.7, 184, 42, 43, 175, 194; D7/601, 637
See application file for complete search history.

(56) References Cited

U.S. PATENT DOCUMENTS

| | | | | |
|---|---|---|---|---|
| 465,070 | A * | 12/1891 | Trew | A47L 19/04 |
| | | | | 220/572 |
| 1,557,950 | A * | 10/1925 | Wassermann | A47B 65/15 |
| | | | | 211/11 |
| 2,123,837 | A * | 7/1938 | Thomas | B65D 7/20 |
| | | | | 211/85.31 |
| 2,479,118 | A * | 8/1949 | Jenness | A47L 19/04 |
| | | | | 211/41.5 |
| 2,596,312 | A * | 5/1952 | Von Mertens | A47J 47/16 |
| | | | | 211/78 |
| 2,939,586 | A * | 6/1960 | Dumaine | A47F 7/0064 |
| | | | | 211/41.7 |

(Continued)

*Primary Examiner* — Jennifer E. Novosad
(74) *Attorney, Agent, or Firm* — Pauly, DeVries Smith & Deffner LLC

(57) ABSTRACT

An organizer for bakeware, cookware, and other products is disclosed, the organizer containing a base with openings divided by supports. The base is expandable and the supports adjustable to accommodate various sized objects for storage and organizing.

13 Claims, 8 Drawing Sheets

(56) References Cited

U.S. PATENT DOCUMENTS

| | | | | |
|---|---|---|---|---|
| 2,983,388 A * | 5/1961 | Cross | A47J 47/16 | 211/78 |
| 5,060,810 A * | 10/1991 | Jones | A47F 7/0035 | 211/4 |
| 5,772,046 A * | 6/1998 | Tercher | A47F 7/0028 | 211/12 |
| 5,833,075 A * | 11/1998 | Czaplinski | A47L 19/04 | 211/41.2 |
| 5,882,603 A * | 3/1999 | Taggart | B01L 9/543 | 206/443 |
| 6,070,743 A * | 6/2000 | Hsueh | A47B 81/068 | 206/519 |
| 6,131,746 A * | 10/2000 | Huang | A47B 46/00 | 211/41.11 |
| 6,170,676 B1 * | 1/2001 | Patadia | A47L 19/04 | 211/41.3 |
| 6,626,301 B2 * | 9/2003 | de Rouvray | G11B 33/0444 | 211/40 |
| 6,769,751 B1 * | 8/2004 | Harbison | A47B 77/14 | 312/311 |
| 7,086,538 B2 * | 8/2006 | Stravitz | B42F 17/20 | 211/11 |
| D545,020 S * | 6/2007 | Yang | D32/55 | |
| 7,267,308 B1 * | 9/2007 | Jenson | A47J 47/16 | 211/181.1 |
| 7,886,917 B1 * | 2/2011 | Berger | A47B 45/00 | 211/85.31 |
| 7,992,728 B2 * | 8/2011 | Burgess | A47F 5/0056 | 211/126.15 |
| 8,087,108 B2 * | 1/2012 | Burns | E03C 1/186 | 211/41.3 |
| D692,199 S * | 10/2013 | Huang | D32/55 | |
| 8,925,742 B1 * | 1/2015 | Chitayat | A47L 19/04 | 211/132.1 |
| 8,960,452 B2 * | 2/2015 | Rhodes, II | A47L 19/04 | 211/41.6 |
| 9,259,084 B1 * | 2/2016 | Palmer | A47B 46/00 | |
| D752,395 S * | 3/2016 | Chen | D6/675.2 | |
| 9,730,553 B2 * | 8/2017 | Bombard | A47J 37/0694 | |
| D809,350 S * | 2/2018 | Goodman | D7/704 | |
| 9,949,595 B1 * | 4/2018 | Greenwood | A47J 47/16 | |
| D826,660 S * | 8/2018 | Klein | D7/704 | |
| 2001/0047968 A1 * | 12/2001 | Wright | A47L 19/04 | 211/41.3 |
| 2003/0098398 A1 * | 5/2003 | Tsuchida | A47G 21/14 | 248/37.6 |
| 2003/0173313 A1 * | 9/2003 | Morgan | A47F 5/01 | 211/41.11 |
| 2004/0168996 A1 * | 9/2004 | Jones | A47F 5/02 | 211/85.18 |
| 2004/0206711 A1 * | 10/2004 | Hoftman | A61B 50/22 | 211/85.13 |
| 2004/0222175 A1 * | 11/2004 | Keating | A61B 50/22 | 211/85.13 |
| 2005/0040120 A1 * | 2/2005 | Pine | A47J 47/20 | 211/41.6 |
| 2006/0054578 A1 * | 3/2006 | Musico | A47F 5/0838 | 211/105.1 |
| 2008/0149644 A1 * | 6/2008 | Piacenza | A47L 19/04 | 220/572 |
| 2008/0210648 A1 * | 9/2008 | Davis | A47L 19/04 | 211/41.3 |
| 2008/0314846 A1 * | 12/2008 | Klein | A47J 47/16 | 211/41.11 |
| 2010/0089848 A1 * | 4/2010 | Thompson | A47J 47/16 | 211/77 |
| 2015/0076086 A1 * | 3/2015 | Tsai | B42F 7/10 | 211/11 |
| 2015/0305594 A1 * | 10/2015 | Jarl | A47B 81/04 | 211/41.5 |
| 2016/0113479 A1 * | 4/2016 | Hawker | A47L 19/04 | 211/41.6 |
| 2019/0159632 A1 * | 5/2019 | Stevens | A47J 47/16 | |

\* cited by examiner

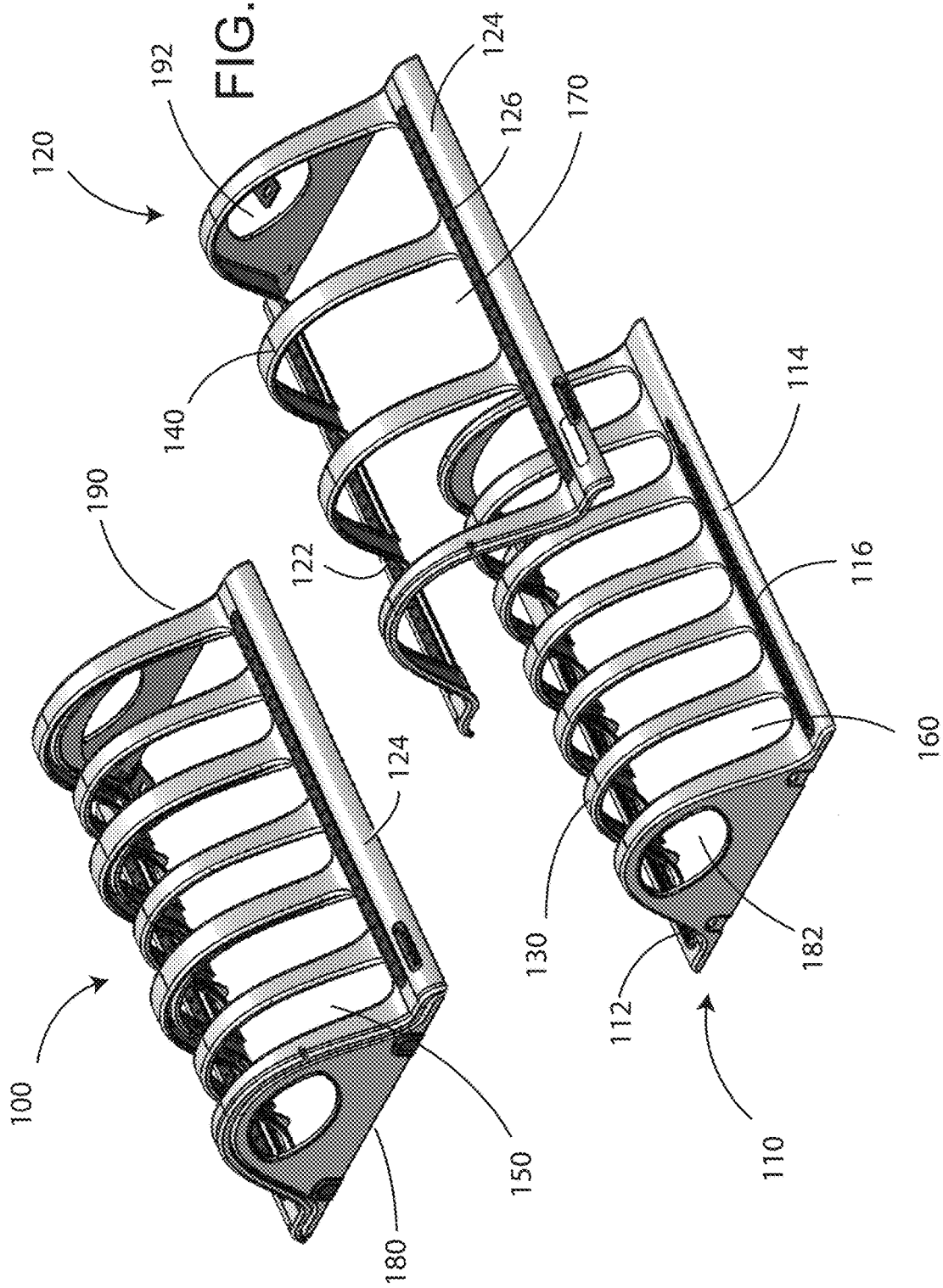

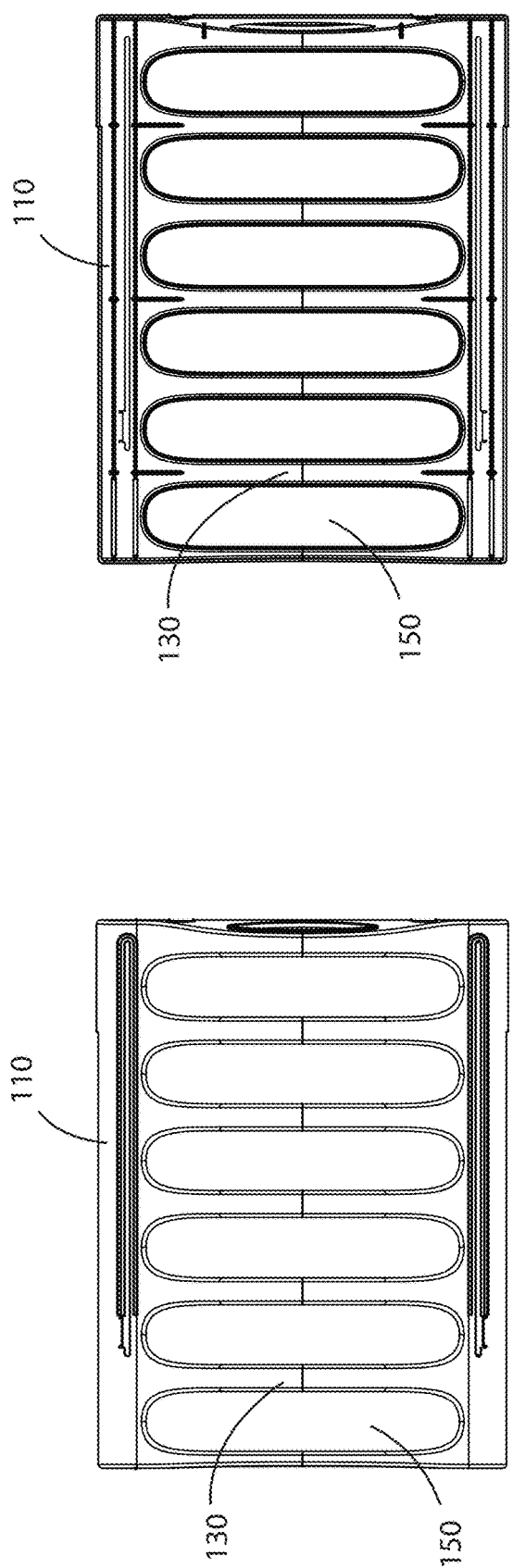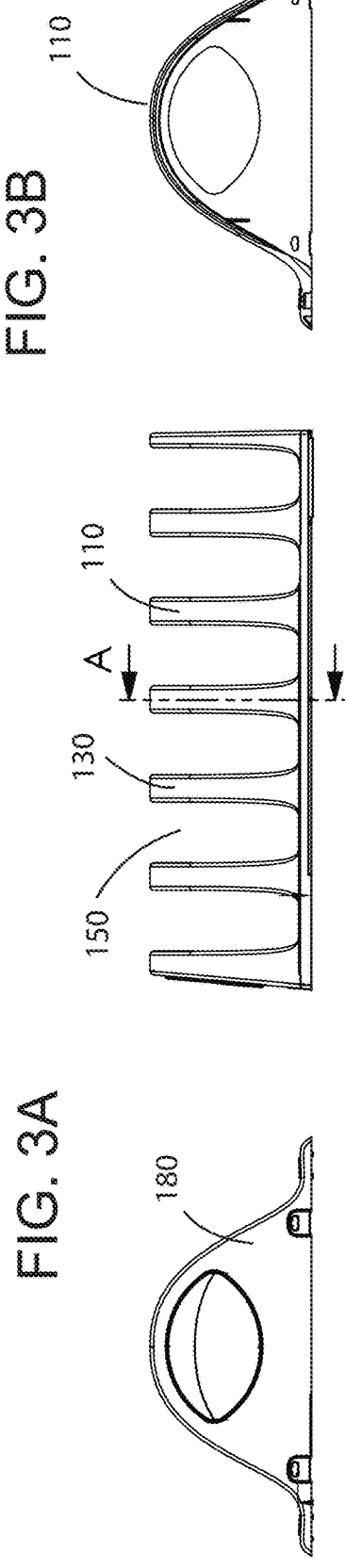

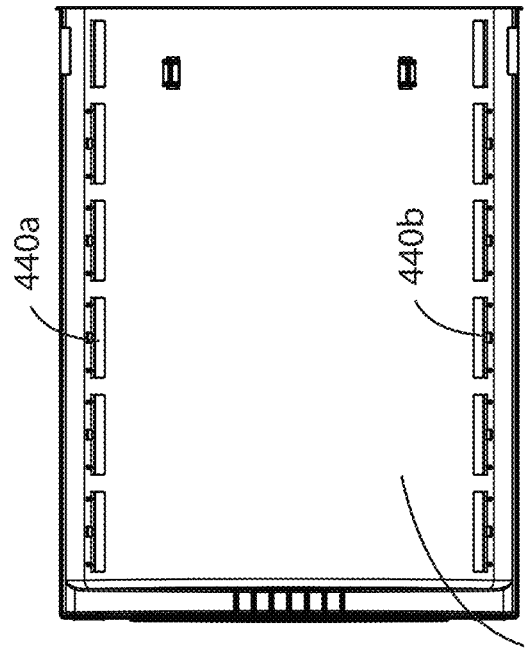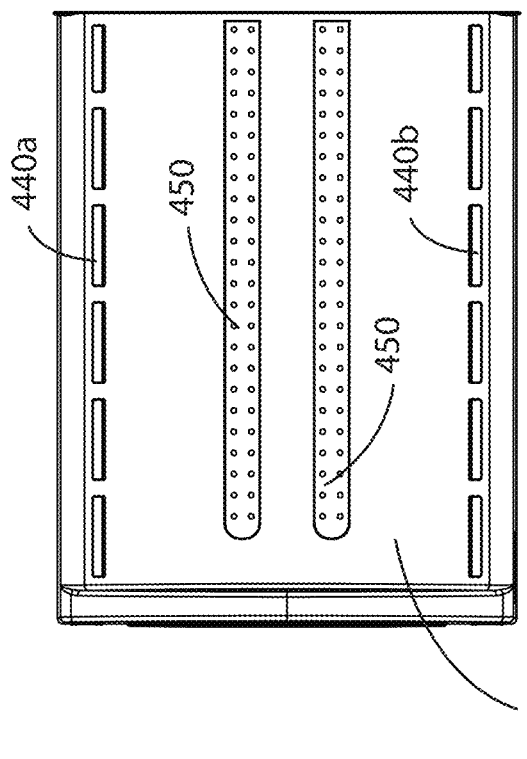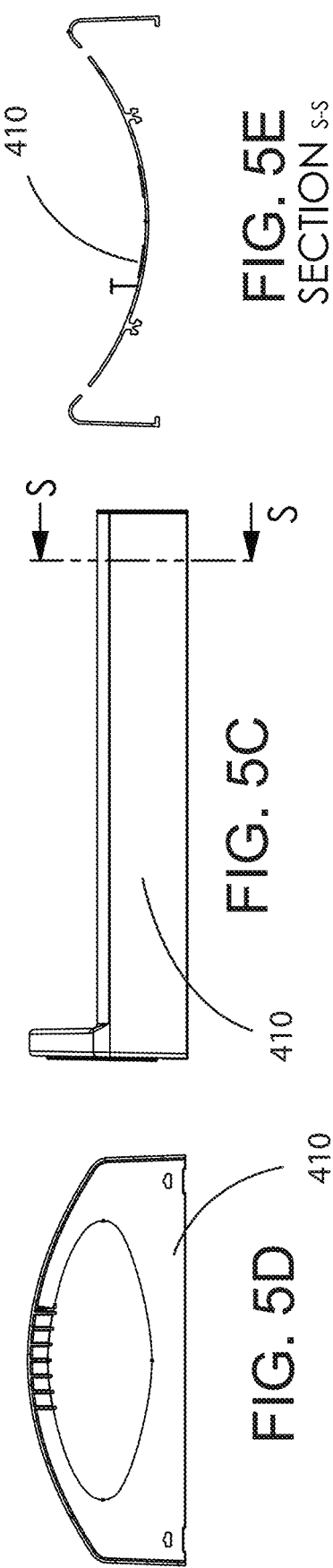
FIG. 5B
FIG. 5A
FIG. 5C
FIG. 5D
FIG. 5E SECTION S-S

DETAIL B

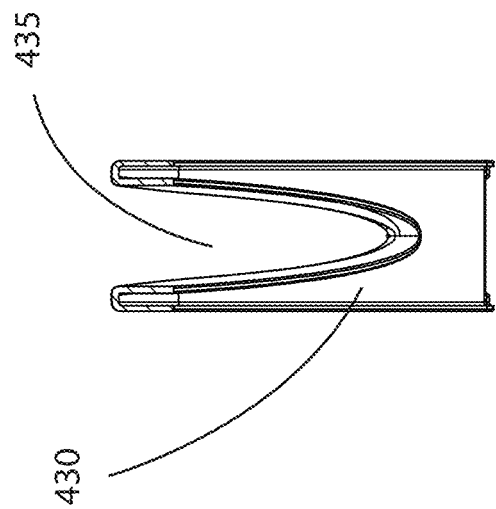
FIG. 7B SECTION E-E
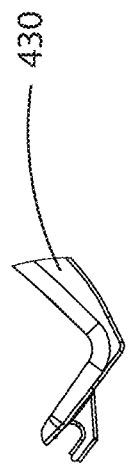
FIG. 7D DETAIL C
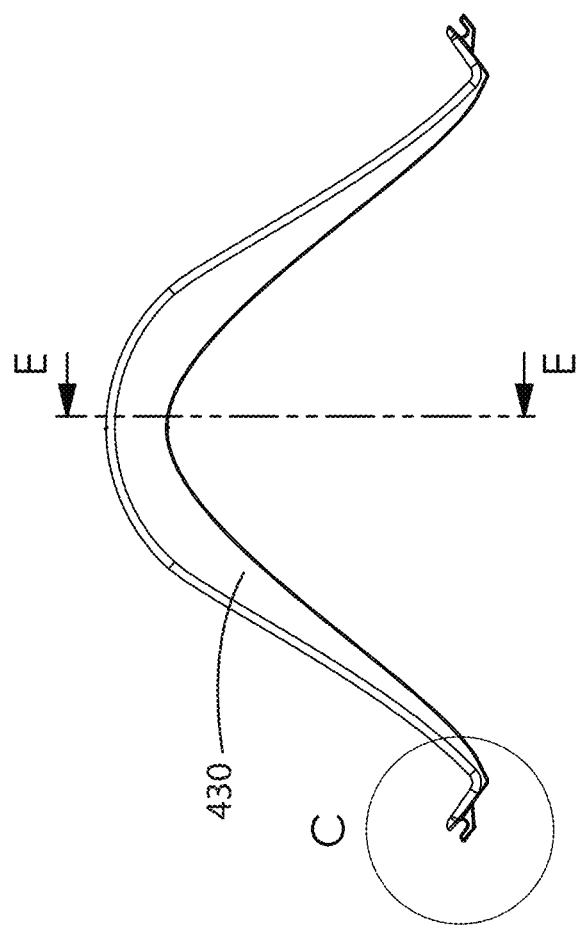
FIG. 7A
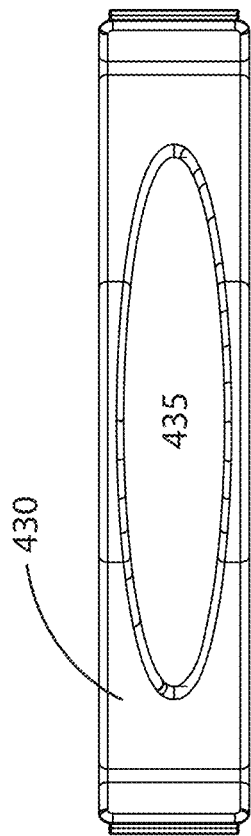
FIG. 7C

BAKEWARE AND COOKWARE ORGANIZER

FIELD

Embodiments herein relate to organizers. More specifically, embodiments herein relate to organizers for storing kitchen items, such as cookware and bakeware

SUMMARY

Embodiments herein include cookware and bakeware. In an embodiment, the organizers include a base, often a two-part (or more) base that is expandable. A plurality of ribs fit into the base or are integrally part of the base, and are configured to retain cookware or bakeware, the plurality of ribs being adjustable by moving the base parts to become wider or narrower, or by moving the ribs along the base parts.

A first configuration is directed to an organizer for kitchen cookware and bakeware, the organizer comprising a first base portion, the first base portion have a first rail, a second rail, and a plurality of ribs extending from the first rail to the second rail to form a first plurality of openings; a second base portion, the second base portion having a third rail, a fourth rail, and a plurality of ribs extending from the third rail to the fourth rail to form a second plurality of openings; wherein the second base portion is configured to be placed on top of the first base portion so that at least one of the openings of the second plurality of openings in the second base portion aligns with at least one of the openings of the first plurality of openings of the first base portion.

The organizer for kitchen cookware and bakeware can be constructed such that the second base portion is configured to partially overlap the first base portion so that some of the openings of the first plurality of openings in the first base portion do not overlap with any of the of the openings of the second plurality of openings of the second base portion; and wherein some of the openings of the second plurality of openings in the second base portion do not overlap with any of the of the first openings of the first plurality of openings of the first base portion.

In an embodiment the first plurality of openings in the first base portion are narrower than the second plurality of openings in the second base portion.

In an embodiment the first base portion comprises six openings.

In an embodiment the first base portion comprises three openings.

In an embodiment the openings in the second base portion are substantially twice the width of the openings in the first base portion.

In an embodiment the kitchen cookware and bakeware organizer further comprises an elastomeric material on a top surface of the rails of the first and second base portions.

In an embodiment the ribs of the first and second portions are arched.

In an embodiment when the first and second base portions are stacked together at least some of the ribs of the second base portion substantially align with and overlap the ribs of the first base portion.

In an embodiment, the organizer includes a handle on the end of the ends and second base portions.

In an embodiment the first base portion comprises an open end and a closed end.

In an embodiment the second base portion comprises an open end and a closed end.

In an embodiment the first base portion comprises an open end and a closed end and the second base portion comprises an open end and a closed end, and wherein when stacked together the closed ends of the first and second ends are opposite one another.

In an embodiment wherein the second base portion comprises a concave surface on the third and fourth rails for engaging a mating convex surface on the first and second rails of the first base portion.

In an embodiment, when the first and second base portions are stacked together onto a support surface they make contact with the support surface along the first rail, second rail, third rail, and fourth rail.

An organizer for kitchen cookware and bakeware is also disclosed having a first base portion, the first base portion have a first row of slots and a second row of slots; a second base portion, the second base portion having a third row of slots, a fourth row of slots; a plurality of ribs configured for insertion into the slots, wherein in the ribs have first ends and second ends configured for insert into first, second, third or fourth row of slots to form openings for retaining cookware and bakeware.

In an embodiment the plurality of ribs further comprise a longitudinal gap for retaining cookware and bakeware In an embodiment the first base portion and second base portion are configured to nest, and when the first and second base portions nest at least some of the first row of slots overlaps with the third row of slots, and some of the second row of slots overlaps with some of the fourth row of slots.

In an embodiment wherein the first and second base portions comprise upwardly-facing nesting bottom surfaces.

In an embodiment when the first and second base portions are nested together the first and second base portions both contact a supporting surface.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures, in which:

FIG. 1A shows an example organizer in a first combined form made in accordance with an implementation of the present disclosure.

FIG. 1B shows an example organizer in an exploded view made in accordance with an implementation of the present disclosure.

FIG. 3A shows a bottom plan view of second base portion of an organizer made in accordance with an implementation of the present disclosure.

FIG. 3B shows a top plan view of a second base portion of an organizer made in accordance with an implementation of the present disclosure.

FIG. 3C shows an end view of a second base portion of an organizer made in accordance with an implementation of the present disclosure.

FIG. 3D shows a side view of a second base portion of an organizer made in accordance with an implementation of the present disclosure.

FIG. 3E shows an end view of a second base portion of an organizer made in accordance with an implementation of the present disclosure.

FIG. 5A shows a top plan view of first base portion of an organizer made in accordance with an implementation of the present disclosure.

FIG. 5B shows a bottom plan view of first base portion of an organizer made in accordance with an implementation of the present disclosure.

FIG. 5C shows a side view of a second base portion of an organizer made in accordance with an implementation of the present disclosure.

FIG. 5D shows an end view of a second base portion of an organizer made in accordance with an implementation of the present disclosure.

FIG. 5E shows a cross-sectional view of a second base portion of an organizer made in accordance with an implementation of the present disclosure.

FIG. 7A shows an end view of a rib made in accordance with the design of FIGS. 4A and 4B.

FIG. 7B shows a side view of a rib made in accordance with the design of FIGS. 4A and 4B.

FIG. 7C shows a top view of a rib made in accordance with the design of FIGS. 4A and 4B.

FIG. 7D shows an enlarged view of a portion of a rib made in accordance with the design of FIGS. 4A and 4B.

Figure 2B:
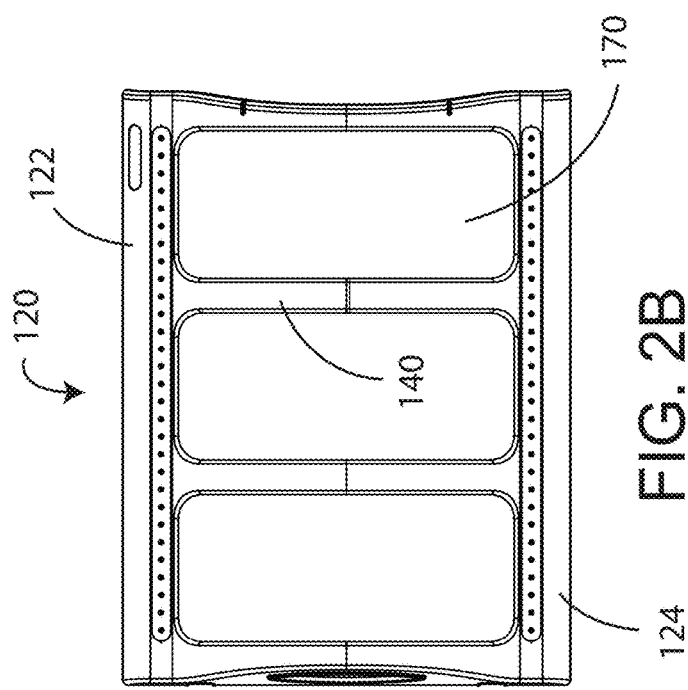
FIG. 2B shows a top plan view of a first base portion of an organizer made in accordance with an implementation of the present disclosure.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

This disclosure is directed to organizers for holding cookware and bakeware, such as pans, lids, pots, cookie sheets, etc.

A first configuration is directed to an organizer for kitchen cookware and bakeware, the organizer comprising a first base portion, the first base portion have a first rail, a second rail, and a plurality of ribs extending from the first rail to the second rail to form a first plurality of openings; a second base portion, the second base portion having a third rail, a fourth rail, and a plurality of ribs extending from the third rail to the fourth rail to form a second plurality of openings; wherein the second base portion is configured to be placed on top of the first base portion so that at least one of the openings of the second plurality of openings in the second base portion aligns with at least one of the openings of the first plurality of openings of the first base portion.

The organizer for kitchen cookware and bakeware of claim 1, wherein the second base portion is configured to partially overlap the first base portion so that some of the openings of the first plurality of openings in the first base portion do not overlap with any of the of the openings of the second plurality of openings of the second base portion; and wherein some of the openings of the second plurality of openings in the second base portion do not overlap with any of the of the first openings of the first plurality of openings of the first base portion.

In an embodiment the first plurality of openings in the first base portion are narrower than the second plurality of openings in the second base portion.

In an embodiment the first base portion comprises six openings. In an embodiment the first base portion comprises three openings. In an embodiment the openings in the second plurality of openings are substantially twice the width of the openings in the first plurality of openings. In an embodiment the kitchen cookware and bakeware organizer further comprises an elastomeric material on a top surface of the rails of the first and second base portions.

In an embodiment the ribs of the first and second portions are arched.

In an embodiment when the first and second base portions are stacked together at least some of the ribs of the second base portion substantially align with and overlap the ribs of the first base portion. In an embodiment, further comprising a handle on the end of the ends and second base portions. In an embodiment the first base portion comprises an open end and a closed end. In an embodiment wherein the second base portion comprises an open end and a closed end. In an embodiment the first base portion comprises an open end and a closed end and the second base portion comprises an open end, and wherein when stacked together the closed ends of the first and second ends are opposite one another.

In an embodiment the second base portion comprises a concave surface on the third and fourth rails for engaging the first and second rails of the first base portion. In an embodiment when the first and second base portions are stacked together onto a support surface they both make contact with the support surface along the first rail, second rail, third rail, and fourth rail.

An organizer for kitchen cookware and bakeware is also disclosed having a first base portion, the first base portion have a first row of slots and a second row of slots; a second base portion, the second base portion having a third row of slots, a fourth row of slots; a plurality of ribs configured for insertion into the slots, wherein in the ribs have first ends and second ends configured for insert into first, second, third or fourth row of slots to form openings for retaining cookware and bakeware.

In an embodiment the plurality of ribs further comprise a longitudinal gap for retaining cookware and bakeware In an embodiment the first base portion and second base portion are configured to nest, and when the first and second base portions nest at least some of the first row of slots overlaps with the third row of slots, and some of the second row of slots overlaps with some of the fourth row of slots.

In an embodiment wherein the first and second base portions comprise upwardly-facing nesting bottom surfaces.

In an embodiment when the first and second base portions are nested together the first and second base portions both contact a supporting surface.

Referring to FIGS. 1 to 3, a design is shown wherein two bases interlock to create an organizer rack. The bases have integrated ribs, with one base having ribs that are twice as far apart as the ribs of the other base. The two bases next together and can be arranged to totally overlap (as shown at the top of FIG. 1), or can partially overlap. The totally overlapping design is advantageous for small spaces and for smaller (thinner) items. The partial overlap (not shown) allows for retention of more cooking items, including some of greater thickness (by being held in the wider gaps between the ribs.

In alternative designs, such as those shown in FIGS. 4 to 7, a base includes slots for retaining a plurality of removable ribs that can be adjusted in location to make wider or narrower areas for retaining cookware. The base can be in two parts (see FIG. 4B) that allows for various overall widths of the organizer, as well as variable gaps between the ribs. The number of ribs in use can be varied, as can their spacing. The ribs can have, as shown, a split top to allow for holding a lid, such as the lid of a pot.

FIG. 1A shows an example organizer 100 in a first combined form made in accordance with an implementation of the present disclosure. FIG. 1B shows the example organizer 100 of FIG. 1A in an exploded view made in accordance with an implementation of the present disclosure. The organizer 100 includes a first base portion 110 and a second base portion 110. The first and second base portions 110 and 120 are configured to nest with one another, with the second base portion 120 fitting on top of the first base portion 110, as shown in FIG. 1A. The first and second base portions 110, 120 include a plurality of ribs 130, 140, respectively. The ribs 130 and 140 form openings 160, 170 in the first and second base portions 130 and 140. When stacked together they form combined openings 150. The first base portion 110 includes first rail 112 and second rail 114; and the second base portion 120 includes third rail 122 and 124. First base portion 110 includes a first end 180 with an opening or handle 182; the second base portion 120 includes a second end 190 with opening or handle 192.

The second base portion 120 is configured to partially overlap the first base portion 110 so that some of the openings of the first plurality of openings 150 in the first base portion 110 do not overlap with any of the of the openings of the second plurality of openings 170 of the second base portion 120; and wherein some of the openings of the second plurality of openings 170 in the second base portion 120 do not overlap with any of the first openings of the first plurality of openings 160 of the first base portion 110.

In an embodiment the first plurality of openings 160 in the first base portion 110 are narrower than the second plurality of openings 170 in the second base portion 120.

In an embodiment the first base portion 110 comprises six openings. In an embodiment the first base portion comprises three openings. In an embodiment the openings in the second plurality of openings 170 are substantially twice the width of the openings in the first plurality of openings 160. In an embodiment the kitchen cookware and bakeware organizer further comprises an elastomeric material 116, 126 on a top surface of the rails of the first and second base portions 110, 120.

In an embodiment when the first and second base portions 110, 120 are stacked together at least some of the ribs 140 of the second base portion 120 substantially align with and overlap some of the ribs 130 of the first base portion 110. In an embodiment, the first and second base portions 110, 120 also include a handle or opening 182, 192 on the ends of the first and second base portions 110, 120. In an embodiment the first base portion 110 comprises an open end and a closed end. In an embodiment the second base portion 120 comprises an open end and a closed end. In an embodiment the first base portion 110 comprises an open end and a closed end and the second base portion 120 comprises an open end and a closed end, and wherein when stacked together the closed ends of the first and second ends are opposite one another and the open ends overlap one another.

Figure 2D:
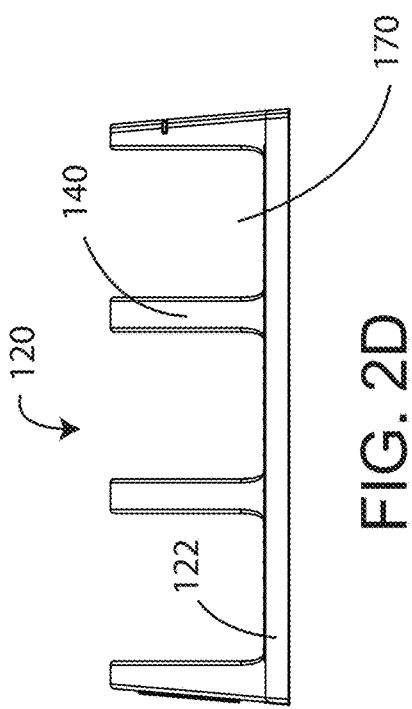
FIG. 2D shows a side view of a first base portion of an organizer made in accordance with an implementation of the present disclosure.
Figure 2A:
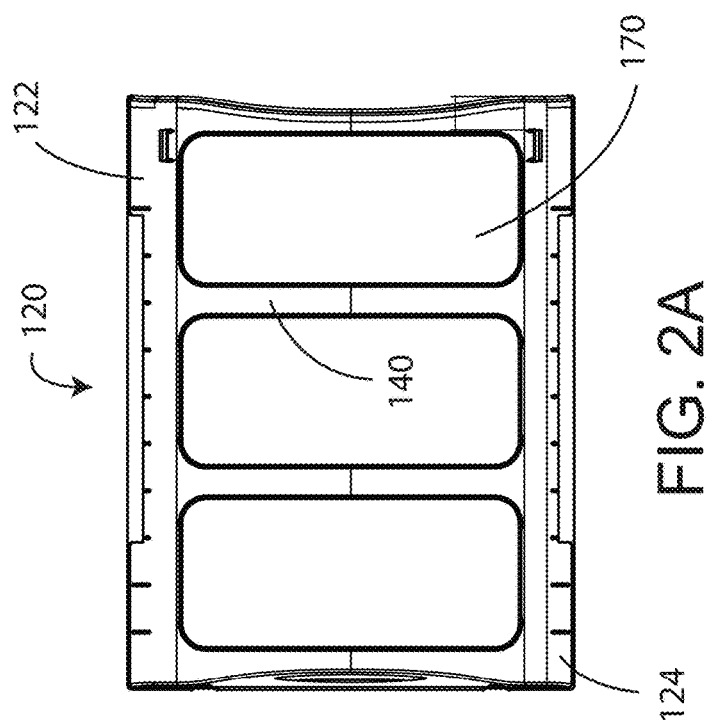
FIG. 2A shows a bottom plan view of first base portion of an organizer made in accordance with an implementation of the present disclosure.

FIG. 2A shows a bottom plan view of a second base portion 120 of an organizer 100 made in accordance with an implementation of the present disclosure, showing ribs 140 and openings 170, along with rails 122 and 124. FIG. 2B shows a top plan view of the second base portion 120 of an organizer 100 made in accordance with an implementation of the present disclosure also showing ribs 140 and openings 170, along with rails 122 and 124. Elastomeric material 126 is also depicted. This elastomeric material 126 serves to keep cookware, bakeware and other things held within the organizer 100 from readily sliding.

Figure 2C:
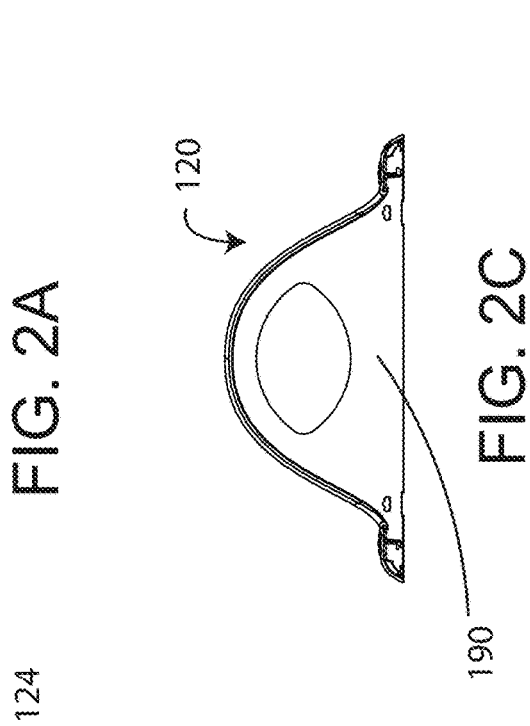
FIG. 2C shows an end view of a first base portion of an organizer made in accordance with an implementation of the present disclosure.

FIG. 2C shows an end 190 of a second base portion 120 of an organizer 100 made in accordance with an implementation of the present disclosure. FIG. 2D shows a side view of a second base portion 120 of an organizer 110 made in accordance with an implementation of the present disclosure.

FIG. 3A shows a bottom plan view of a first base portion 110 of an organizer 110 made in accordance with an implementation of the present disclosure. FIG. 3B shows a top plan view of the first base portion 110 of the organizer 1100 made in accordance with an implementation of the present disclosure, showing openings 150 separated by ribs 130. FIG. 3C shows a side view of a first base portion 110 of an organizer 100 made in accordance with an implementation of the present disclosure, also showing the ribs 130 and openings 150. FIG. 3D shows an end view of the first base portion of an organizer made in accordance with an implementation of the present disclosure. FIG. 3E shows a cross section view of first base portion 110 of an organizer made in accordance with an implementation of the present disclosure, taken along lines A-A of FIG. 3C.

Figure 4A:
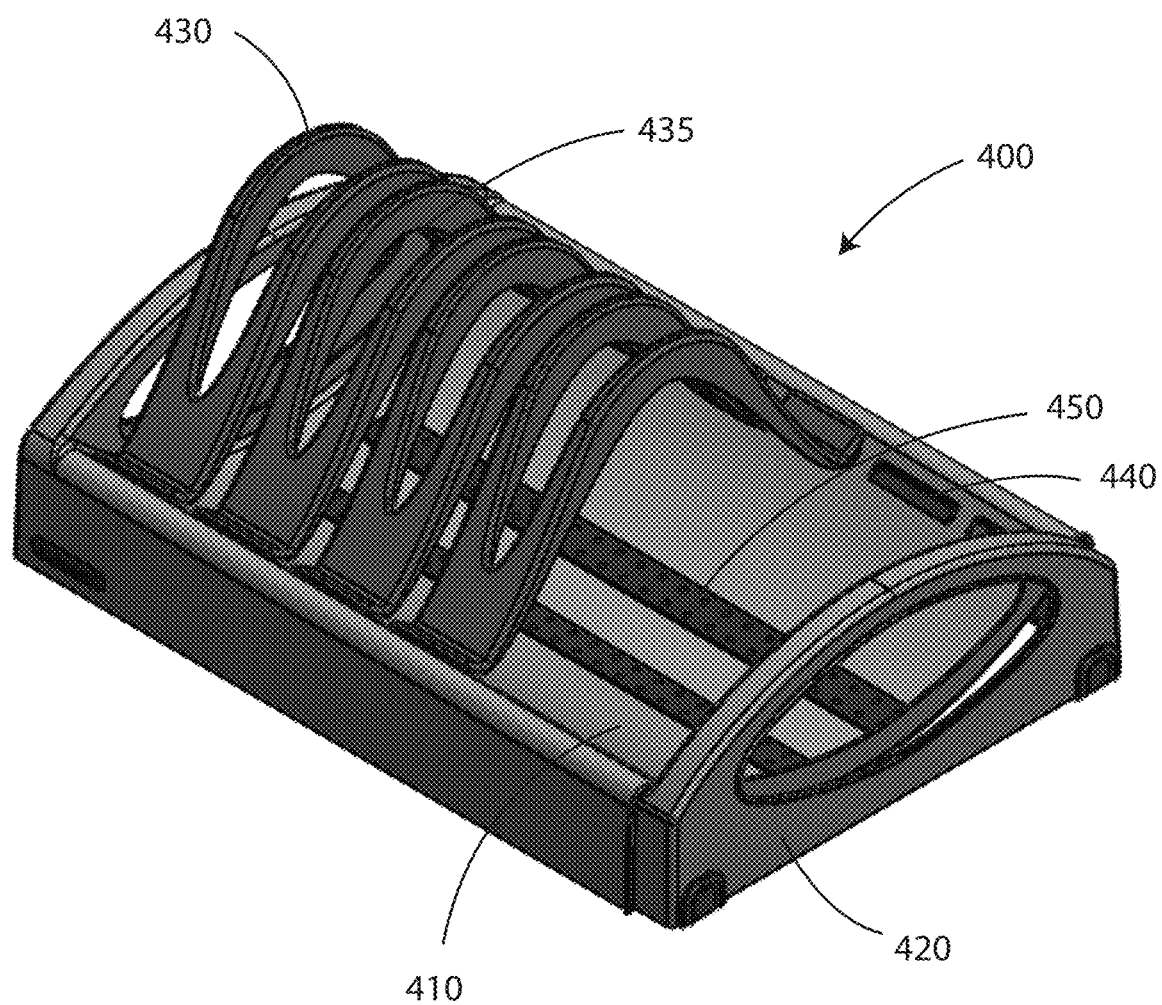
FIG. 4A shows an example organizer in a second embodiment made in accordance with an implementation of the present disclosure, the design showing an organizer with removable ribs.
Figure 4B:
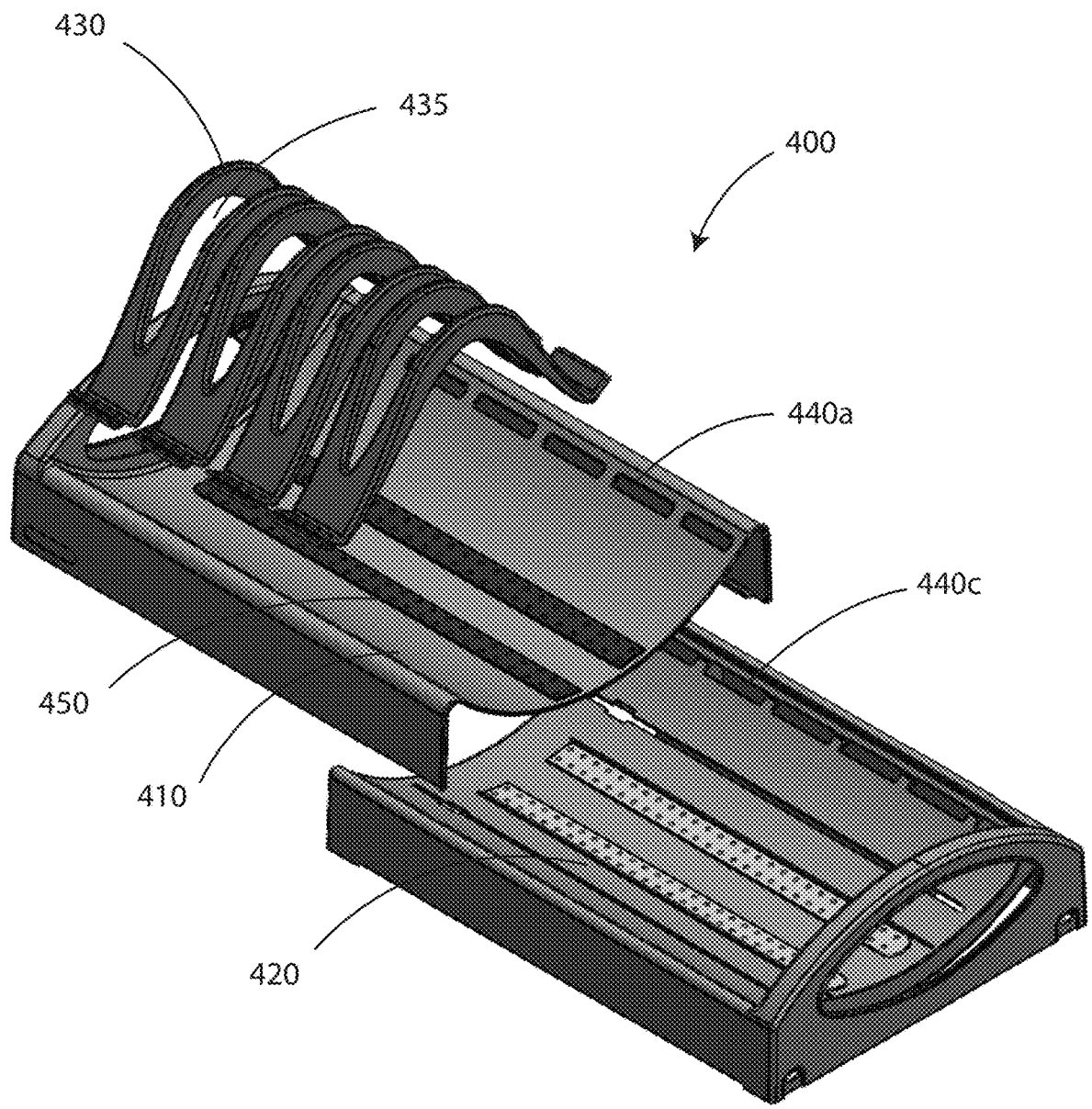
FIG. 4B shows the example of FIG. 4A in exploded view.

FIG. 4A shows an example organizer 400 in a second embodiment made in accordance with an implementation of the present disclosure, the design showing an organizer with removable ribs. FIG. 4B shows the example of an organizer 400 of FIG. 4A in exploded view. The organizer has a first base portion 410, the first base portion 410 has a first row of slots 440a and a second row of slots 440b; a second base portion 420, the second base portion having a third row of slots 440c and a fourth row of slots 440d; a plurality of ribs 430 are configured for insertion into the slots 440, wherein the ribs have first ends and second ends configured for insert into first, second, third or fourth row of slots 440a, 440b, 440c, and 440d to form openings for retaining cookware and bakeware. In an embodiment the plurality of ribs 430 further comprise a longitudinal gap 435 for retaining cookware and bakeware. In an embodiment the first base portion 410 and second base portion 410 are configured to nest, and when the first and second base portions 410, 420 nest at least some of the first row of slots overlaps with the third row of slots, and some of the second row of slots overlaps with some of the fourth row of slots. In an embodiment wherein the first and second base portions comprise upwardly-facing nesting bottom surfaces. In an embodiment when the first and second base portions are nested together the first and second base portions both contact a supporting surface.

FIG. 5A shows a top plan view of first base portion 410 of an organizer 400 made in accordance with an implementation of the present disclosure. FIG. 5B shows a bottom plan view of first base portion 410 of an organizer 400 made in accordance with an implementation of the present disclosure. FIG. 5B shows a bottom plan view of first base portion 410 of an organizer 400 made in accordance with an implementation of the present disclosure. FIG. 5C shows a side view of a first base portion 410 of an organizer 400 made in accordance with an implementation of the present disclosure. FIG. 5D shows an end view of a first base portion of an organizer 410 made in accordance with an implementation of the present disclosure. FIG. 5E shows a cross-sectional view of a first base portion of an organizer made in accordance with an implementation of the present disclosure.

Figure 6B:
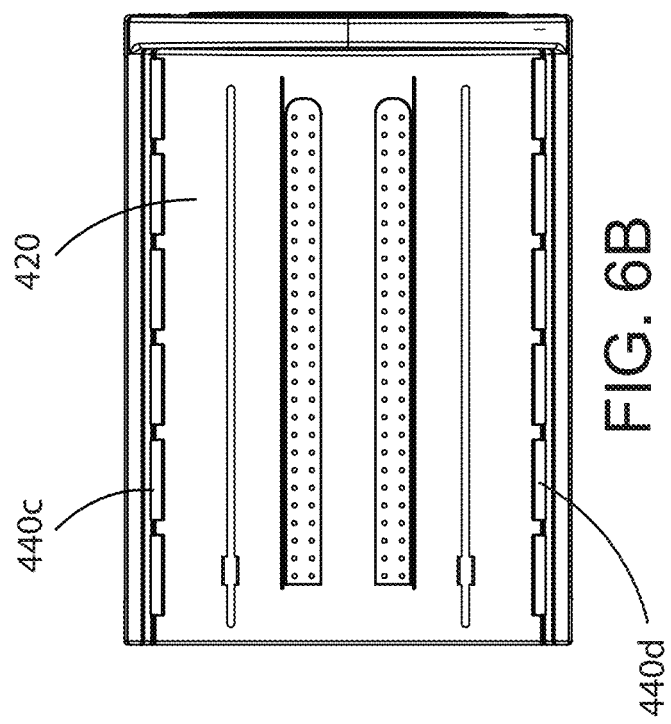
FIG. 6B shows a top plan view of second base portion of an organizer made in accordance with an implementation of the present disclosure.
Figure 6E:
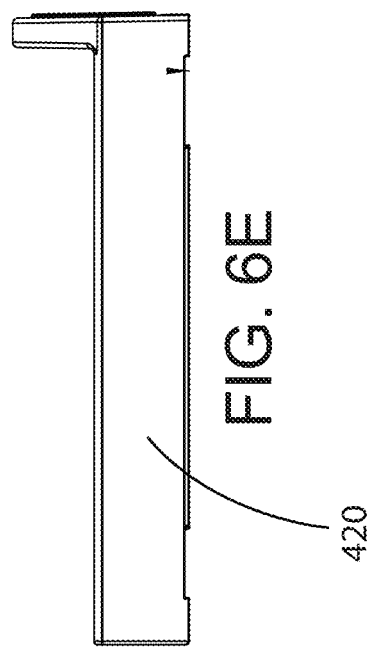
FIG. 6E a side view of a second base portion of an organizer made in accordance with an implementation of the present disclosure.
Figure 6D:
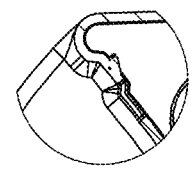
FIG. 6D shows closeup of a portion of a second base portion of an organizer made in accordance with an implementation of the present disclosure.
Figure 6A:
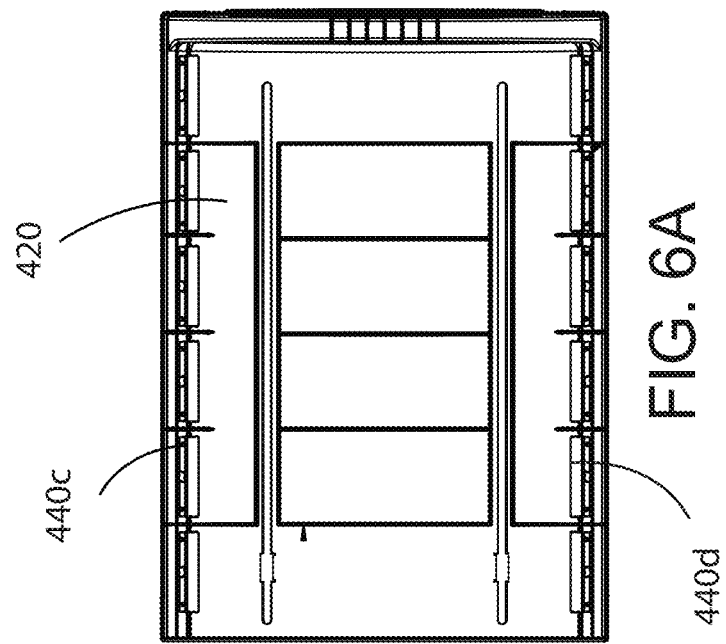
FIG. 6A shows a bottom plan view of second base portion of an organizer made in accordance with an implementation of the present disclosure.
Figure 6C:
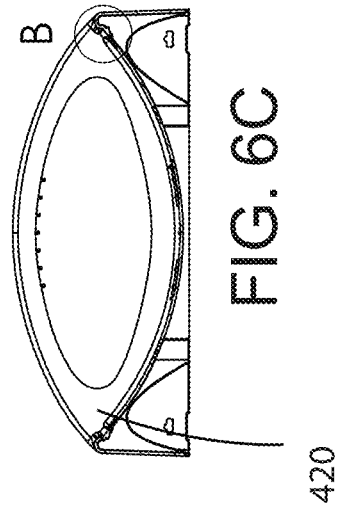
FIG. 6C shows a side view of a second base portion of an organizer made in accordance with an implementation of the present disclosure.

FIG. 6A shows a bottom plan view of second base portion 420 of an organizer 410 made in accordance with an implementation of the present disclosure. FIG. 6B shows a top plan view of second base portion 420 of an organizer 400 made in accordance with an implementation of the present disclosure. FIG. 6C shows a side view of a second base portion 420 of an organizer 400 made in accordance with an implementation of the present disclosure. FIG. 6D shows closeup of a part of a second base portion 420 of an organizer 400 made in accordance with an implementation of the present disclosure. FIG. 6E a side view of a second base portion 420 of an organizer 400 made in accordance with an implementation of the present disclosure.

FIG. 7A shows an end view of a rib 430 made in accordance with the design of FIGS. 4A and 4B. FIG. 7B shows a side view of the rib 430 made in accordance with the design of FIGS. 4A and 4B. FIG. 7C shows a top view of the rib 430 made in accordance with the design of FIGS. 4A and 4B. FIG. 7A shows an enlarged view of a portion of a rib 430 made in accordance with the design of FIG. 4. The ribs 430 show a longitudinal central gap 435 that can be used to also hold a cookware or bakeware item, or other article. For example, gap 437 can hold a lid of a pot.

The bases often are made of molded plastic, but can contain rubber (or similar) surface to make a surface to grip the cookware and bakeware.

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Aspects may be better understood with reference to the following examples. These examples are intended to be representative of specific embodiments, but are not intended as limiting the overall scope of embodiments herein.

We claim:

1. An organizer for kitchen cookware and bakeware, the organizer comprising:
   a first base portion, the first base portion have a first rail, a second rail, and a plurality of ribs extending from the first rail to the second rail to form a first plurality of openings;
   a second base portion, the second base portion having a third rail, a fourth rail, and a plurality of ribs extending from the third rail to the fourth rail to form a second plurality of openings;
   wherein the second base portion is configured to be placed on top of the first base portion so that at least one of the openings of the second plurality of openings in the second base portion aligns with at least one of the openings of the first plurality of openings of the first base portion;
   wherein the first plurality of openings in the first base portion are narrower than the second plurality of openings in the second base portion;
   wherein the first base portion and second base portion are stacked together onto a support surface and they make contact with the support surface along the first rail, second rail, third rail, and fourth rail; and
   wherein the second base portion can expand from the first base portion creating a plurality of openings of varying sizes.

2. The organizer for kitchen cookware and bakeware of claim 1, wherein the second base portion is configured to partially overlap the first base portion so that some of the openings of the first plurality of openings in the first base portion do not overlap with any of the of the openings of the second plurality of openings of the second base portion; and wherein some of the openings of the second plurality of openings in the second base portion do not overlap with any of the of the first openings of the first plurality of openings of the first base portion.

3. The organizer for kitchen cookware and bakeware of claim 1, wherein the first base portion comprises six openings.

4. The organizer for kitchen cookware and bakeware of claim 1, wherein the first base portion comprises three openings.

5. The organizer for kitchen cookware and bakeware of claim 1, wherein the openings in the second plurality of openings are substantially twice the width of the openings in the first plurality of openings.

6. The organizer for kitchen cookware and bakeware of claim 1, further comprising an elastomeric material on a top surface of the rails of the first and second base portions.

7. The organizer for kitchen cookware and bakeware of claim 1, wherein the ribs of the first and second portions are arched.

8. The organizer for kitchen cookware and bakeware of claim 1, wherein when the first and second base portions are stacked together, at least some of the ribs of the second base portion substantially align with and overlap the ribs of the first base portion.

9. The organizer for kitchen cookware and bakeware of claim 1, wherein the first base portion comprises an open end and a closed end and the second base portion comprises an open end and a closed end, further comprising a handle on the closed ends of the first base portion and the second base portion.

10. The organizer for kitchen cookware and bakeware of claim 1, wherein the first base portion comprises an open end and a closed end.

11. The organizer for kitchen cookware and bakeware of claim 1, wherein the second base portion comprises an open end and a closed end.

12. The organizer for kitchen cookware and bakeware of claim 1, wherein the first base portion comprises an open end and a closed end and the second base portion comprises an open end and a closed end, and wherein when stacked together the closed ends of the first base portion and second base portion are opposite one another.

13. The organizer for kitchen cookware and bakeware of claim 1, wherein the second base portion comprises a concave surface on the third and fourth rails for engaging the first and second rails of the first base portion.

* * * * *